United States Patent
Day et al.

[11] 3,891,165
[45] June 24, 1975

[54] RETRIEVAL ASSEMBLY

[75] Inventors: Douglas B. Day; Welfred A. Stahl, both of Dayton, Ohio

[73] Assignee: The United States of America as represented by the Secretary of the Air Force, Washington, D.C.

[22] Filed: Dec. 11, 1973

[21] Appl. No.: 423,855

[52] U.S. Cl. ......... 244/137 R; 294/19 R; 294/83 R
[51] Int. Cl. .................................... B64d 3/00
[58] Field of Search ........... 244/137 R, 118 R, 1 R, 244/17.11, 17.17, 3; 294/19 R, 83 R, 83 A, 58; 114/221 R; 174/556, 6, 7

[56] References Cited
UNITED STATES PATENTS

| | | | |
|---|---|---|---|
| 1,852,629 | 4/1932 | Sturges | 294/19 R X |
| 2,763,506 | 9/1956 | Denker et al. | 294/58 X |
| 2,954,185 | 9/1960 | Spratt | 244/3 |
| 2,991,959 | 7/1961 | Rizzo | 244/3 |
| 3,135,511 | 6/1964 | Norman et al. | 244/3 X |
| 3,177,028 | 4/1965 | Cozzoli | 294/83 A |
| 3,438,596 | 4/1969 | Durno et al. | 244/3 |
| 3,619,773 | 11/1971 | Lathrop | 174/7 X |
| 3,626,572 | 12/1971 | Chang | 174/556 |
| 3,733,097 | 5/1973 | Hank | 294/19 R |

Primary Examiner—Duane A. Reger
Assistant Examiner—Barry L. Kelmachter
Attorney, Agent, or Firm—Arsen Tashjian

[57] ABSTRACT

A retrieval assembly, in combination with an airborne vehicle capable of hovering (e.g., a helicopter), for use in retrieving a downed drone airborne vehicle. The assembly includes a hook subassembly, a pole subassembly which includes a multi-purpose pole, a recovery cable subassembly, and a swivel subassembly, all of which cooperate to capture, lift, support, and carry the downed drone vehicle. The drone, thereby, can be safely suspended beneath the helicopter, and also can rotate while dangling without twisting and subsequently breaking the recovery cable from which the drone is dangling. Therefore, the drone can be reliably, safely, quickly, and easily retrieved.

8 Claims, 10 Drawing Figures

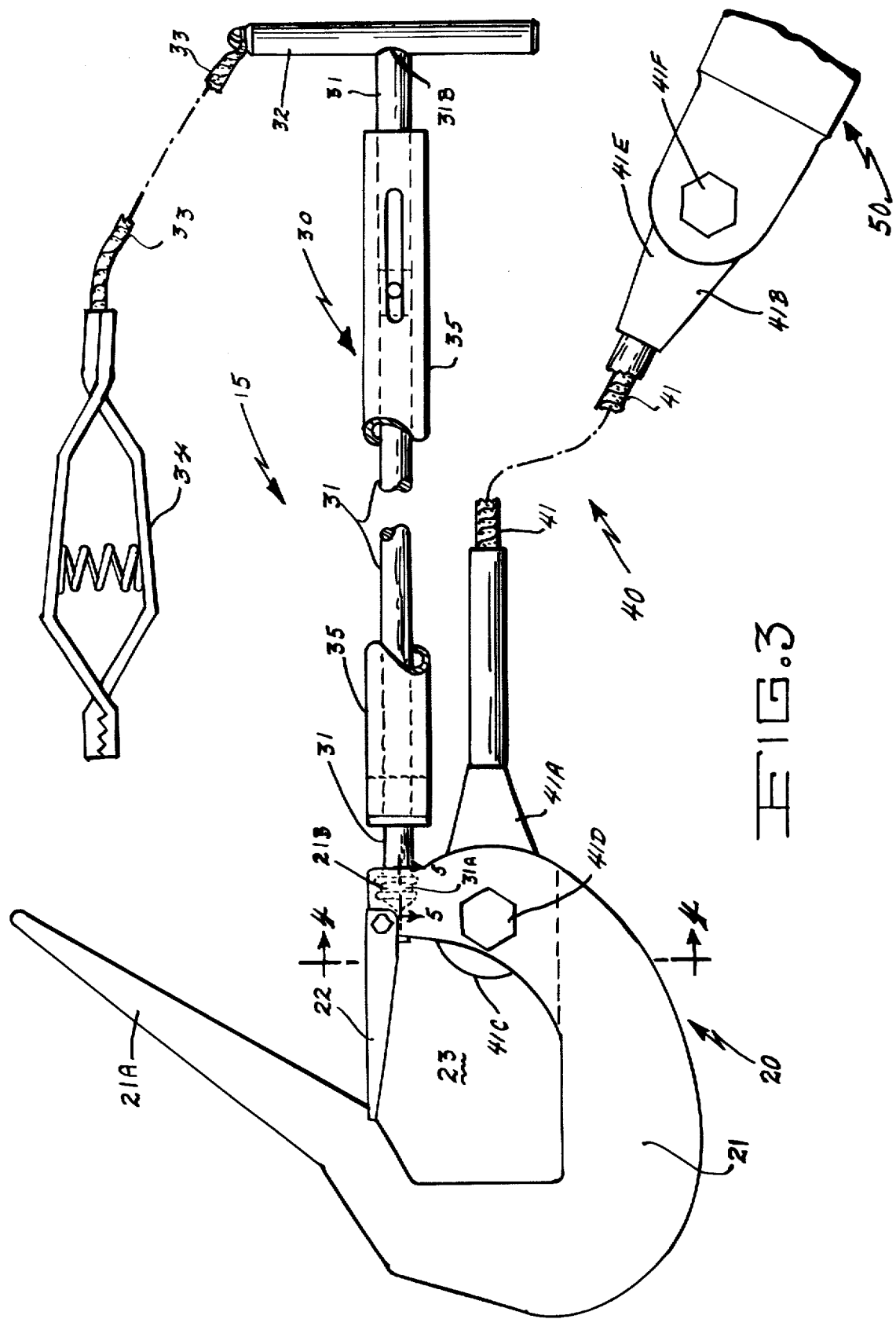

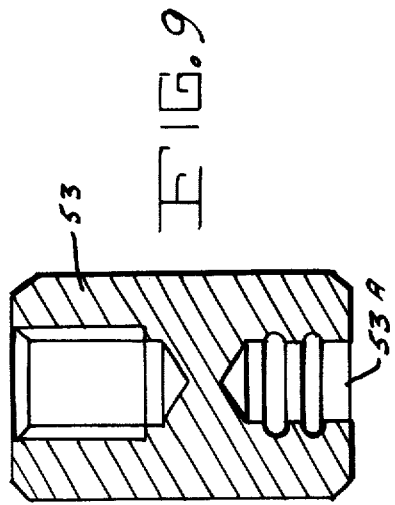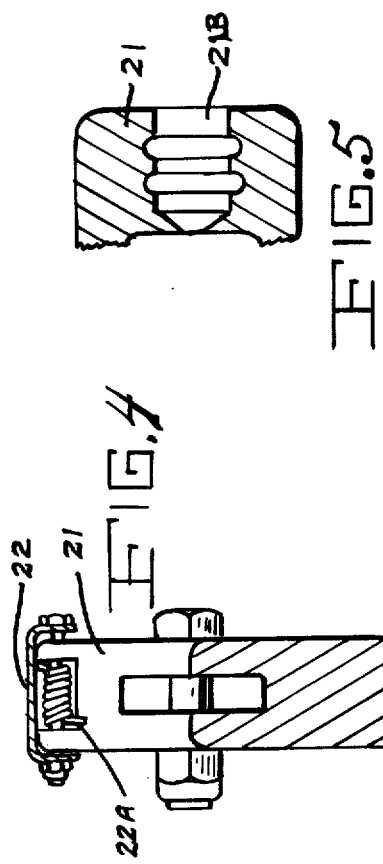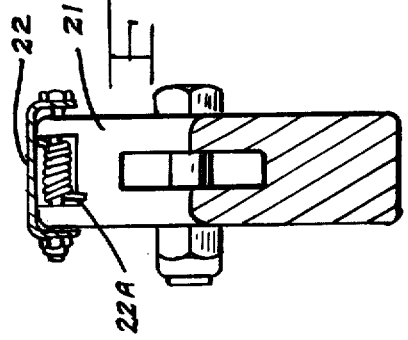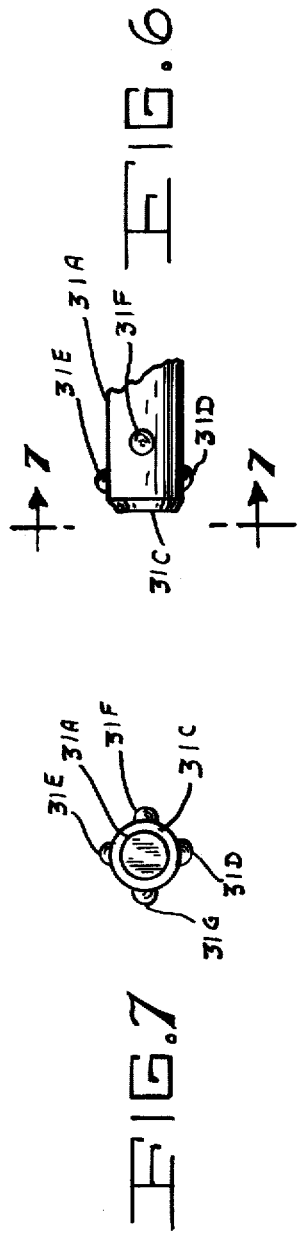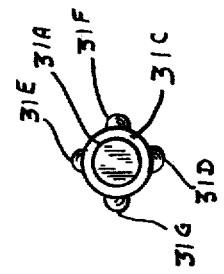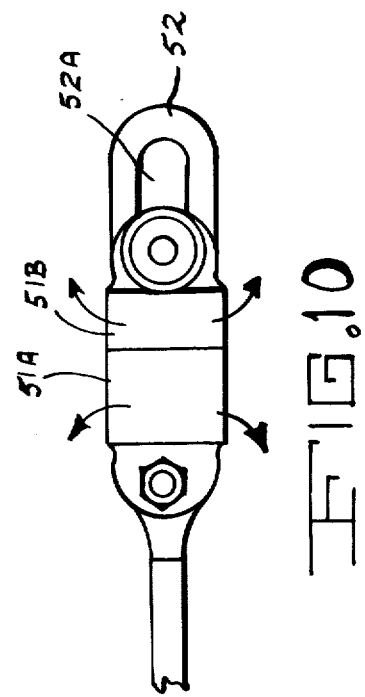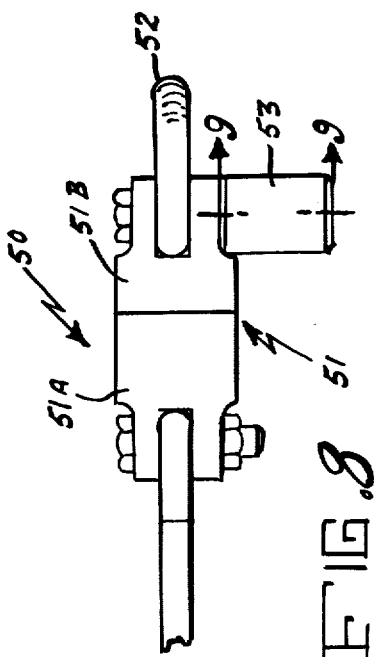

RETRIEVAL ASSEMBLY

BACKGROUND

This invention pertains to a retrieval assembly and, more particularly, to a retrieval assembly which is adapted for use with an airborne vehicle which is capable of hovering. In this adaptation, the inventive retrieval assembly is especially well-suited for retrieving a downed drone airborne vehicle. It is here to be noted that this adaptation is merely and solely by way of illustration, and not because of any limitation of the inventive assembly.

As a preliminary matter, it is also to be noted that the following terms, as used herein, are intended to have the meaning(s), as indicated. The term "airborne vehicle" is intended to mean a vehicle, craft, structure or the like which is capable of airborne flight. Such "airborne vehicles" may include, but are not limited to, airplanes, gliders, and the like; and, such airborne vehicles may also include missiles, spacecraft, and the like, when they are within the atmosphere. An "airborne vehicle capable of hovering" is intended to include, but is not limited to, a helicopter and the like. A "drone airborne vehicle" is intended to means a pilotless airborne vehicle which may or may not be remotely directable.

One of the basic, and continuing, problems of recovering (i.e., retrieving) a downed drone airborne vehicle is that, after the downed drone has been captured by prior art means used in combination with a hoverable airborne vehicle, the captured drone may rotate while being suspended from the capturing airborne vehicle which is in flight. This rotation (or yawing) of the captured and suspended drone results in the twisting of, and in the subsequent breaking of, the cable which is used to suspend the drone from the capturing airborne vehicle. As a result, the drone drops. If the drop is on land, the drone may be recaptured, although most probably it will be in a more damaged condition than when originally captured. If the drop is over water, the drone may sink; and, if so, it cannot be recaptured. Even if the cable does not break, but rather becomes entangled with any portion of the drone (such as the tail) or with anything else while the drone is over water, the cable must be jettisoned or otherwise released with the drone attached. Since this drop is over water, the drone may sink as indicated above, and may not be able to be recaptured.

It is readily apparent, therefore, that what is needed in the art, and is not presently available is an apparatus which will permit rotation of the captured and suspended (i.e., dangling) drone, but which will neutralize the effect of the twisting and obviate the breaking of the suspending cable. Additionally, the apparatus should prevent entanglement, or alternatively should minimize the effect of any entanglement of the cable with the drone.

We have invented such an apparatus, in the form of a retrieval assembly; and, thereby, we have advanced the state-of-the-art.

SUMMARY OF THE INVENTION

Our inventive apparatus pertains to a retrieval assembly, as adapted for use (with an airborne vehicle capable of hovering) in retrieving (i.e., in capturing and returning or bringing back) a downed drone airborne vehicle.

An object of this invention is to permit the reliable, safe, quick, and easy retrieval of a downed drone airborne vehicle.

Another object of this invention is to provide a retrieval assembly which includes a pole subassembly wherein the pole thereof has novel multi-functional purposes.

These objects, and still other related and equally important objects, will become readily apparent after a consideration of the description herein of the invention, coupled with reference to the drawings.

DESCRIPTION OF THE DRAWINGS

FIG. 3 is a view of our inventive retrieval assembly while not in use;

FIGS. 4 and 5 are different views of the novel hook component of the hook subassembly of the inventive retrieval assembly, as taken along lines 4—4 and 5—5 of FIG. 3;

FIGS. 6 and 7 are two views of the fore end of the novel pole component of the pole subassembly of the inventive retrieval assembly; and, FIGS. 8, 9 and 10 are various views of the novel swivel subassembly of the inventive retrieval assembly.

DESCRIPTION OF THE PREFERRED EMBODIMENT

Figure 1:
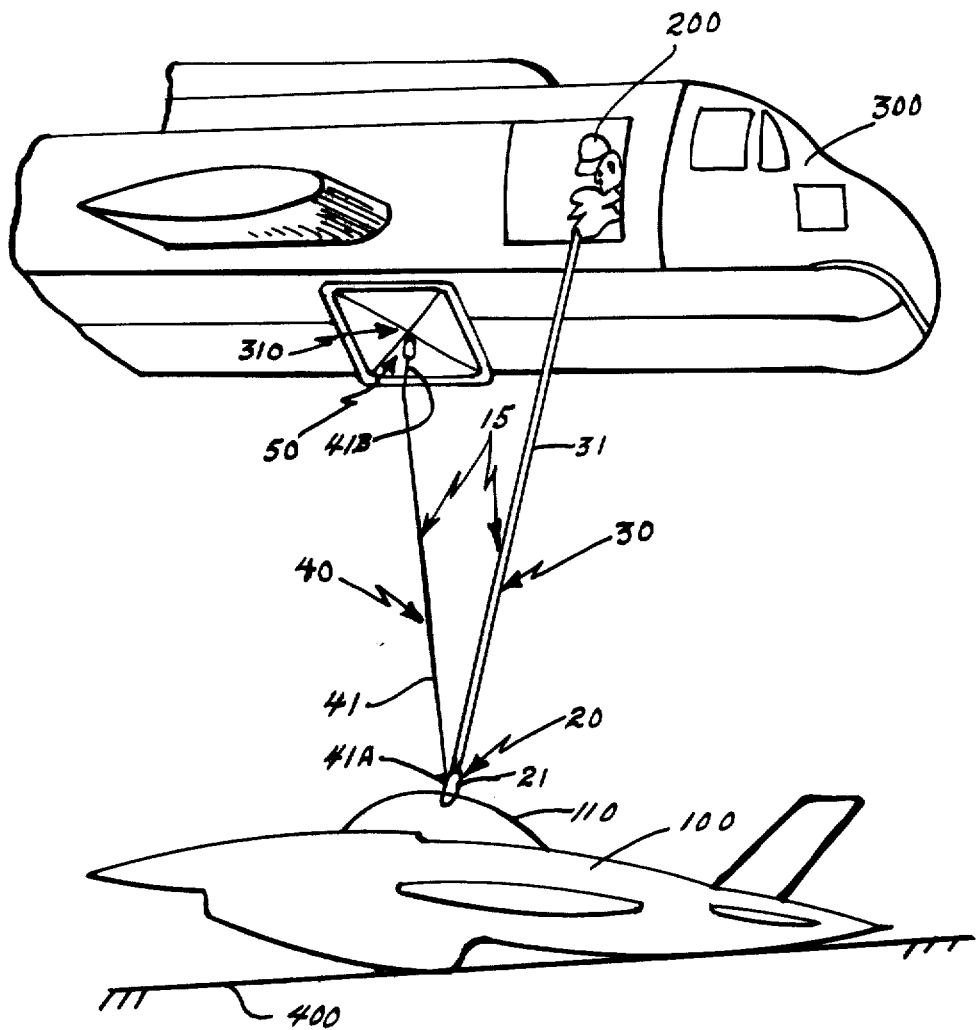
FIG. 1 is a pictorial representation of the use of our inventive retrieval assembly, in combination with an airborne vehicle capable of hovering, in capturing a downed drone airborne vehicle.

In FIGS. 1-10, inclusive, the same component is designated by the same reference numeral.

With reference to FIG. 1, therein is shown a preferred embodiment 15 of our inventive retrieval assembly vehicle being used to "capture" a downed drone airborne vehicle 100, hereinafter referred to as a drone. More specifically, the preferred embodiment 15 of our invention is shown while being used by operator 200 (who is riding in hoverable airborne vehicle 300, which happens in this situation to be a helicopter) in capturing drone 100 which is on land 400 and which said drone 100 has hookable means, such as riser 110, attached to it 100 that can be hooked (or snared, or grasped, or the like). The procedure being performed by operator 200, as shown in FIG. 1, will be discussed in detail later herein. At this time it is appropriate to point out, as is well known by those in the drone retrieval art, that the normal return of the drone to the recovery area is through and by the utilization of a parachute which is part of the drone's equipment, which said parachute is deployed over or enroute to the recovery area, and which said parachute is attached to the drone by hookable means, such as a riser, designated 110 in FIG. 1. It is equally well known by those in the art; that the target area over which the drone 100 (which, in fact, is a/or the target) is flown is over water; that if the target (i.e., the drone) is "hit" it must be recovered from the water; and, that in that case the drone's parachute is jettisoned or released from the drone to prevent or to delay sinking of the drone, with the riser 110 (or other hookable means) remaining attached to drone 100.

Figure 2:
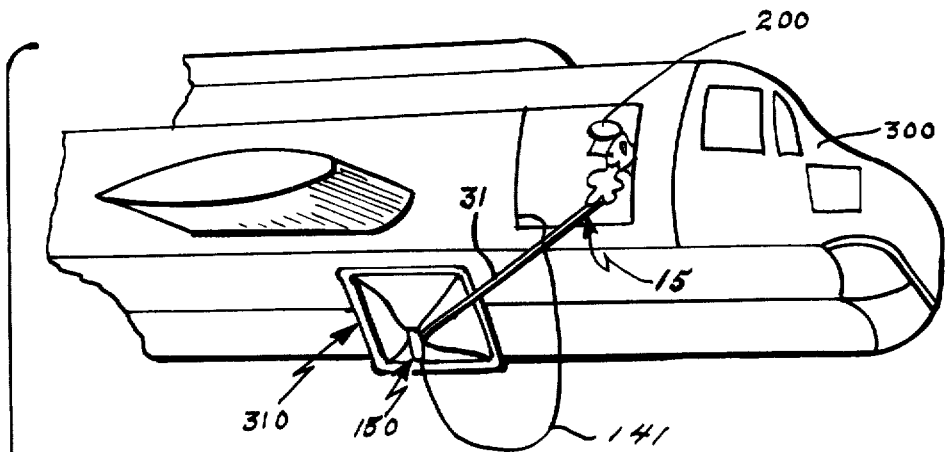
FIG. 2 depicts, in pictorial form, another use of some of the components, of the retrieval assembly, particularly the pole thereof.
Figure 2:

With reference to FIG. 2, therein is shown the preferred embodiment 15 of our invention as it would be utilized by operator 200 to recapture (i.e., rehook, and the like) downed drone 100 in the unlikely event that, despite the use of our invention, the drone 100 becomes entangled in a suspension cable component of our invention 15, and the drone 100 and the suspension cable (previously attached to the drone by having been hooked to the riser 110 thereof, FIG. 1) are jettisoned on land 400. The procedure followed by the operator 200 in these improbable circumstances will be further discussed later herein.

With reference to FIG. 3, therein is shown our inventive retrieval assembly 15, while not in use. Our inventive assembly 15 includes: a hook subassembly 20 by which the hookable means, such as riser 110, FIGS. 1 and 2, of the drone 100 may be releasably hooked; a pole subassembly 30; a recovery cable subassembly 40; and, a swivel subassembly 50.

The hook subassembly 20 includes: a hook 21 (preferably made of an aluminum alloy) having two ends, with an elongated jaw 21A at one end, and with an opening or cavity 21B (preferably tap drilled) at the other end, and also with a biased keeper 22 at said other end. The keeper 22 (also preferably made of an aluminum alloy) and the elongated jaw 21A limit and define the throat 23 of the hook 21. The keeper 22 is biased, preferably with a spring, so that to gain entry to (or to egress from) the throat 23, the keeper 22 must be moved inwardly, i.e., toward the throat 23.

The pole subassembly 30 includes: a shaft or pole 31 (preferably 12 feet long and also preferably made of an aluminum alloy) having two ends, a fore end 31A and an aft end 31B, with the fore end 31A suitably dimensioned and configurated to fit into and mate with complementary opening 21B of hook 21, thereby permitting the pole 31 (at the fore end 31A) to be removably attachable to hook 21; a handle or grip 32 (also preferably made of an aluminum alloy) attached to the aft end 31B of pole 31; a ground wire 33 having two ends, with one end attached to handle 32; a grounding clip 34 connected to the other end of the ground wire 33; and, a hollow cylindrical tube 35 (also preferably made of an aluminum alloy) surrounding pole 31 and being slideably movable between the fore end 31A and the aft end 31B of the pole 31.

The recovery cable subassembly 40 includes a recovery cable or wire rope 41 preferably of one half inch diameter and of steel and having a fore end 41A and an aft end 41B, with the fore end 41A connected to the hook 21 of hook subassembly 20. The cable end-to-hook connection is preferably, but need not be, by a first swaging terminal 41C attached to the cable fore end 41A and, in turn, attached to hook 21 by bolting means 41D.

The swivel subassembly 50 is connected to the aft end 41B of the recovery cable subassembly 40. The cable end-to-swivel subassembly connection also preferably is, but need not be, by a second swaging terminal 41E attached to the cable aft end 41B and, in turn, attached to swivel subassembly 50 by bolting means 41F.

FIG. 4 is a view, partially in cross section, of hook 21 as seen when the hook 21 is viewed along lines 4-4 shown in FIG. 3, with swaging terminal 41A removed. Keeper 22, which preferably is made of an aluminum alloy, is biased preferably by a spring, such as 22A, which preferably is made of music wire.

FIG. 5 is a view, in cross section and partially fragmented, of hook 21 seen as viewed along lines 5-5 in FIG. 3. Female-type cavity 21A in hook 21 is drilled, preferably in the configuration shown, to accept and to releasably hold, fore end 31A, FIG. 3, of pole 31, thereby resulting in the releasable attachment of the pole 31 to hook 21.

It is here to be noted that, as a matter of convenience, the hook 21 as shown in FIG. 3, and the views of the hook 21 as shown in FIGS. 4 and 5 are not to scale.

With reference to FIG. 6, therein is shown a side elevation view, partially fragmented, of pole 31, and more particularly of fore end 31A of said pole 31. Fore end 31A is preferably chamfered, such as is generally designated by reference numeral 31C, and holds in a captivated condition a plurality of balls, preferably four of which three (i.e., 31D, 31E, and 31F) are shown, and also preferably in a plurality of rows, such as the two rows shown in FIG. 6.

As to FIG. 7, therein is shown a view of fore end 31A of pole 31 as seen along lines 7—7 in FIG. 6. All of the four preferred balls 31D, 31E, 31F and 31G are easily seen, as also is the preferred two-row arrangement of the balls (i.e., one row formed by balls 31D and 31E, and another row formed by balls 31F and 31G). As can be also seen, the balls are located preferably 90 degrees apart. Additionally, the balls are preferably spring-loaded.

It is appropriate here also to note that the fore end 31A together with the captivated balls comprise the "ball" portion of the "ball-and-socket" (i.e., snapdetent) arrangement, whereby pole 31 is rendered removably attachable to hook 21, with complementary configurated and dimensioned cavity 21 forming the socket portion of the arrangement. On the other hand, the arrangement might also be referred to as a male-female mating arrangement.

FIGS. 8, 9 and 10 are various views of our novel swivel subassembly 50, FIG. 3, of our inventive retrieval assembly 15. As shown in FIG. 8, the swivel subassembly 50, includes: swivel 51 which in part comprises fore portion 51A and aft portion 51B; aft link 52; and, swivel adapter 53. The swivel 51 may be a McMaster-Carr No. 3516Y15 or equal; and, link 52 may be a McMaster-Carr No. 3566T18 or equal. Swivel adapter 53 is of our own inventive structure; replaces the nut which is normally furnished with a commercially obtainable swivel; and, is shown in FIG. 9 in cross section, as seen along lines 9—9 of FIG. 8. In FIG. 9, the swivel adapter 53 is shown as having, in the lower portion thereof, an opening or cavity 53A which is identical to the cavity 21B of hook 21, FIGS. 3 and 5, and of course cavity 53A will accept and will releasably hold fore end 31A of pole 31, FIGS. 3, 6 and 7. The adapter 53 is preferably made of an aluminum alloy. In FIG. 10, which is a top plan view of swivel assembly 50, the directional arrows show the independent rotatable capability of swivel portions 51A and 51B. Also shown, generally designated by reference numeral 52A, is the throat of aft swivel link 52 whereat the cargo hook (not shown) of the helicopter 300, FIG. 2, is releasably connected.

MANNER OF USE AND OF OPERATION OF THE PREFERRED EMBODIMENT

With reference to FIG. 1, when a drone (such as 100) is downed, a hoverable airborne vehicle (such as 300)

is dispatched to the scene, with: the aft portion of the swivel subassembly 50 attached to the helicopter cargo hook (and, of course, to the cargo hook subassembly 310) which is attached to the helicopter 300; aft end 41B of the recovery cable 41 attached to the aft portion of the swivel subassembly 50; the fore end 31A of the pole 31 removably attached to hook 21 of hook subassembly 20; and, with grounding clip 34 of pole subassembly 30 suitably attached to helicopter 300 to dissipate static electricity.

The helicopter 300 hovers over downed drone 100, and the operator 200 of the retrieval assembly 15 hooks, couples, engages and secures riser 110 with and to hook 21 of hook subassembly 20 of the retrieval assembly 15, thereby in effect securing downed drone 100 to helicopter 300. More specifically, after hooking riser 110 with hook 21, the operator releases hook 21 from pole 31 by disengaging fore end 31A of pole 31 from cavity 21B of hook 21, and he 200 then retrieves the pole 31 per se.

From the pictorial representation in FIG. 1 of the activity conducted, and of the procedure performed, one can see: that fore end 41A of recovery cable 41 is attached to, and remains attached to, hook 21; that the aft end 41B of recovery cable 41 remains attahced to the fore portion of swivel subassembly 50; that the aft end of swivel subassembly 50 (and, more definitively, the aft link 52 thereof) remains connected to (but is releasably connected to, i.e., is detachable from) the helicopter cargo hook (and, of course, to the cargo hook subassembly 310) which, in turn, is attached to helicopter 300.

The helicopter 300 is then used to lift, to support, and to carry the drone 100, by suspension from the helicopter 300 and the hook subassembly 20, the recovery cable subassembly 40, and the swivel subassembly 50 attached thereto 300. Thereby, the downed drone 100 is retrieved.

It is to be noted that, when helicopter 300 is dispatched to retrieve downed drone 100, a plurality of hook subassemblies 20 and of recovery cable subassemblies 40 are ciarried aboard the helicopter for improbable, but possible and potential use. For example, if the recovery is over water (or, on land where the helicopter is unable to land for some reason), and if however improbable the recovery cable 41 becomes entangled with the drone 100 (such as the tail thereof), or with anything else, the recovery cable 41 and the hook 21 are (and must be) jettisoned for helicopter safety. Then, one of the plurality of spare hook subassemblies 20 and of the recovery cable subassemblies 40 carried aboard the helicopter are used as replacements for the jettisoned ones; and, the procedure described hereinabove to hook the downed drone 100 is used to reconnect the substitute hook 21, and the recovery cable 41 connected thereto, to the downed drone 100. In this regard, it is to be remembered that the pole 31 has the structural capability of being removably attachable either to the hook 21 or to the swivel subassembly 50 (i.e., the swivel adapter 53 thereof), by virtue of being insertable into and removable from the cavity 21B of hook 21 and the cavity 53A of the swivel adapter 53. In FIG. 2, the operator 200 of the retrieval assembly 15 is shown attaching, with pole 31, a replacement recovery cable 141 and a replacement swivel subassembly 150 to cargo hook and cargo hook subassembly 310.

The original recovery cable 41 is shown entangled with the tail of the drone 100.

CONCLUSION

It is abundantly clear from all of the foregoing, and from the drawings, that the desired objects (and also other related objects) of our inventive retrieval assembly 15 have been attained.

It is emphasized that, although there have been described and shown the fundamental unique features of our inventive assembly as applied to a preferred embodiment 15 which has been adapted for a particular use (i.e., retrieval of a downed drone, such as 100, FIGS. 1 and 2), it is to be understood that various other embodiments, substitutions, additions, omissions, adaptations and the like can be made by persons of ordinary skill in the art, without departing from the spirit of our invention.

What is claimed is:

1. A retrieval assembly, in combination with an airborne vehicle capable of hovering, for use in retrieving a downed drone airborne vehicle having hookable means attached to it, wherein the hoverable airborne vehicle has a cargo hook and is capable of lifting, supporting, and carrying the downed drone airborne vehicle by suspension thereof, comprising:
   a. a hook subassembly which includes a hook by which the hookable means of the downed drone airborne vehicle may be releasably hooked;
   b. a pole subassembly which includes a pole having a fore end and an aft end, with said fore end removably attached to said hook of said hook subassembly;
   c. a recovery cable subassembly which includes a recovery cable having a fore end and an aft end, with said fore end connected to said hook of said hook assembly;
   d. and, a swivel subassembly which includes a swivel having a fore portion and an aft portion, with said fore portion connected to said aft end of said recovery cable, and with said aft portion of said swivel releasably connected to the cargo hook of the hoverable airborne vehicle, and also with said aft portion removably attachable to said fore end of said pole of said pole subassembly;
   whereby the hookable means of the downed drone airborne vehicle is hooked and secured by and with said hook of said hook subassembly, and thereby the downed drone airborne vehicle may be lifted, supported, and carried by the hoverable airborne vehicle by suspension thereof.

2. A retrieval assembly, as set forth in claim 1, wherein said hook of said hook subassembly has two ends, with an elongated jaw at one end, and with a cavity at the other end suitably dimensioned and configurated to accept and mate with said fore end of said pole of said pole assembly, and also with said hook having a biased keeper at said other end of said hook.

3. A retrieval assembly, as set forth in claim 2, wherein said keeper at said other end of said hook is biased by a spring.

4. A retrieval assembly, as set forth in claim 1, wherein said pole of said pole assembly has a handle attached to said aft end of said pole, and said pole assembly further includes: a ground wire having two ends, with one end attached to said pole handle; a grounding clip connected to the other end of said ground wire;

and, a hollow cylindrical tube surrounding said pole and being slideably movable between said fore end and said aft end of said pole.

5. A retrieval assembly, as set forth in claim 1, wherein said hook of said hook subassembly is made of an aluminum alloy.

6. A retrieval assembly, as set forth in claim 1, wherein said pole of said pole subassembly is made of an aluminum alloy.

7. A retrieval assembly, as set forth in claim 1, wherein said recovery cable of said recovery cable subassembly is a steel wire cable of not less than one half inch in diameter.

8. A swivel assembly, as set forth in claim 1, wherein said aft portion of said swivel has attached thereto an aft link for releasably connecting said aft portion of said swivel to the cargo hook of the hoverable airborne vehicle, also wherein said aft portion of said swivel has attached thereto a swivel adapter having an opening which will accept and will releasably hold said fore end of said pole of said pole assembly.

* * * * *